US009342353B2

(12) United States Patent
Cherel et al.

(10) Patent No.: US 9,342,353 B2
(45) Date of Patent: May 17, 2016

(54) TECHNIQUES FOR IMPLEMENTING INFORMATION SERVICES WITH TENANT SPECIFIC SERVICE LEVEL AGREEMENTS

(71) Applicant: INTERNATIONAL BUSINESS MACHINES CORPORATION, Armonk, NY (US)

(72) Inventors: Thomas Cherel, Saint-Eustache (FR); Ivan Matthew Milman, Austin, TX (US); Martin Oberhofer, Bondorf (DE); Donald Andrew Padilla, Albuquerque, NM (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 218 days.

(21) Appl. No.: 13/646,700

(22) Filed: Oct. 6, 2012

(65) Prior Publication Data
US 2014/0101299 A1    Apr. 10, 2014

(51) Int. Cl.
G06F 15/173 (2006.01)
G06F 9/46 (2006.01)
H04L 12/24 (2006.01)

(52) U.S. Cl.
CPC .......... *G06F 9/468* (2013.01); *H04L 41/5051* (2013.01); *H04L 41/5096* (2013.01)

(58) Field of Classification Search
CPC .......... G06F 17/30528; G06F 9/5077; H04L 12/5825
USPC .......... 709/223, 202, 229
See application file for complete search history.

(56) References Cited

U.S. PATENT DOCUMENTS

| | | | |
|---|---|---|---|
| 2009/0288084 A1* | 11/2009 | Astete .............. | G06F 9/45533 718/1 |
| 2011/0252420 A1* | 10/2011 | Tung .............. | G06F 9/45533 718/1 |
| 2012/0030168 A1* | 2/2012 | Weissenberger et al. ..... | 707/611 |
| 2012/0089980 A1* | 4/2012 | Sharp .............. | G06F 9/45558 718/1 |
| 2012/0096271 A1* | 4/2012 | Ramarathinam ... | H04L 63/0807 713/172 |
| 2012/0173581 A1* | 7/2012 | Hartig et al. .............. | 707/781 |
| 2013/0204849 A1* | 8/2013 | Chacko .............. | G06F 3/0604 707/692 |
| 2014/0006731 A1* | 1/2014 | Uluski .............. | G06F 3/0604 711/155 |
| 2014/0019335 A1* | 1/2014 | MacDonald et al. .......... | 705/39 |
| 2014/0032228 A1* | 1/2014 | Johri .............. | G06F 21/6227 705/1.1 |

OTHER PUBLICATIONS

Harshavardhan Jegadeesan et al., "A Method to Support Variability of Enterprise Services on the Cloud", IEEE International Conference on Cloud Computing, 2009, IEEE.
(Continued)

*Primary Examiner* — Ruolei Zong
(74) *Attorney, Agent, or Firm* — Russell Ng PLLC; William Stock

(57) ABSTRACT

A technique for selecting an information service implementation includes receiving a service request that includes a tenant identifier that uniquely identifies a calling tenant. Transformation logic to service the service request is selected based on the received tenant identifier. One or more data sources and one or more data targets are selected for the service request based on the received tenant identifier. Data from the selected data sources is processed using the selected transformation logic and the processed data is stored at the selected data targets.

20 Claims, 6 Drawing Sheets

(56) References Cited

OTHER PUBLICATIONS

Julia Schroeter et al., "Towards Modeling a Variable Architecture for Multi-Tenant SaaS-Application", Proceedings of Sixth International Workshop on Variability Modelling of Software-Intensive Systems (VaMoS '12), Jan. 2012, ACM.

Ralph Mietzner et al., "Variability Modeling to Support Customization and Deployment of Multi-Tenant-Aware Software as a Service Applications", ICSE Workshop on Principles of Engineering Services Oriented Systems, 2009, IEEE.

* cited by examiner

TECHNIQUES FOR IMPLEMENTING INFORMATION SERVICES WITH TENANT SPECIFIC SERVICE LEVEL AGREEMENTS

BACKGROUND

1. Technical Field

The present invention generally relates to information services and in particular to techniques for implementing information services with tenant specific service level agreements.

2. Description of the Related Art

In general, cloud computing refers to Internet-based computing where shared resources, software, and information are provided to users of computer systems and other electronic devices (e.g., mobile phones) on demand, similar to the electricity grid. Adoption of cloud computing has been aided by the widespread adoption of virtualization, which is the creation of a virtual (rather than actual) version of something, e.g., an operating system, a server, a storage device, network resources, etc. A virtual machine (VM) is a software implementation of a physical machine (e.g., a computer system) that executes instructions like the physical machine. VMs are usually categorized as system VMs or process VMs. A system VM provides a complete system platform that supports the execution of a complete operating system (OS). In contrast, a process VM is usually designed to run a single program and support a single process. A characteristic of a VM is that application software running on the VM is limited to the resources and abstractions provided by the VM. System VMs (also referred to as hardware VMs) allow the sharing of the underlying physical machine resources between different VMs, each of which executes its own OS. The software that provides the virtualization and controls the VMs is typically referred to as a VM monitor (VMM) or hypervisor. A hypervisor may run on bare hardware (Type 1 or native VMM) or on top of an operating system (Type 2 or hosted VMM).

Cloud computing provides a consumption and delivery model for information technology (IT) services based on the Internet and involves over-the-Internet provisioning of dynamically scalable and usually virtualized resources. Cloud computing is facilitated by ease-of-access to remote computing sites (via the Internet) and frequently takes the form of web-based tools or applications that a cloud consumer or tenant can access and use through a web browser, as if the tools or applications were a local program installed on a computer system of the tenant. Commercial cloud implementations are generally expected to meet quality of service (QoS) requirements of consumers and typically include service level agreements (SLAs). Tenants avoid capital expenditures by renting usage from a cloud vendor (i.e., a third-party provider). In a typical cloud implementation, tenants consume resources as a service and pay only for resources used.

An Internet point-of-presence (POP) is an access point to the Internet that may house servers, routers, gateways, asynchronous transfer mode (ATM) switches, and/or digital/analog call aggregators. An Internet POP may be, for example, part of the facilities of a telecommunications provider that an Internet service provider (ISP) rents or at a location separate from the telecommunications provider. A typical ISP may have thousands of POPs, each of which corresponds to a different physical location. In a POP cloud, it is usually unclear to a tenant where data of the tenant resides, as a location of an access point (e.g., gateway) appears to the tenant to be the location of the data.

BRIEF SUMMARY

Disclosed are a method, a data processing system, and a computer program product (embodied in a computer-readable storage medium) for implementing information services with tenant specific service level agreements in cloud computing environments.

A technique for selecting an information service implementation includes receiving a service request that includes a tenant identifier that uniquely identifies a calling tenant. Transformation logic to service the service request is selected based on the received tenant identifier. One or more data sources and one or more data targets are selected for the service request based on the received tenant identifier. Data from the selected data sources is processed using the selected transformation logic and the processed data is stored at the selected data targets.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
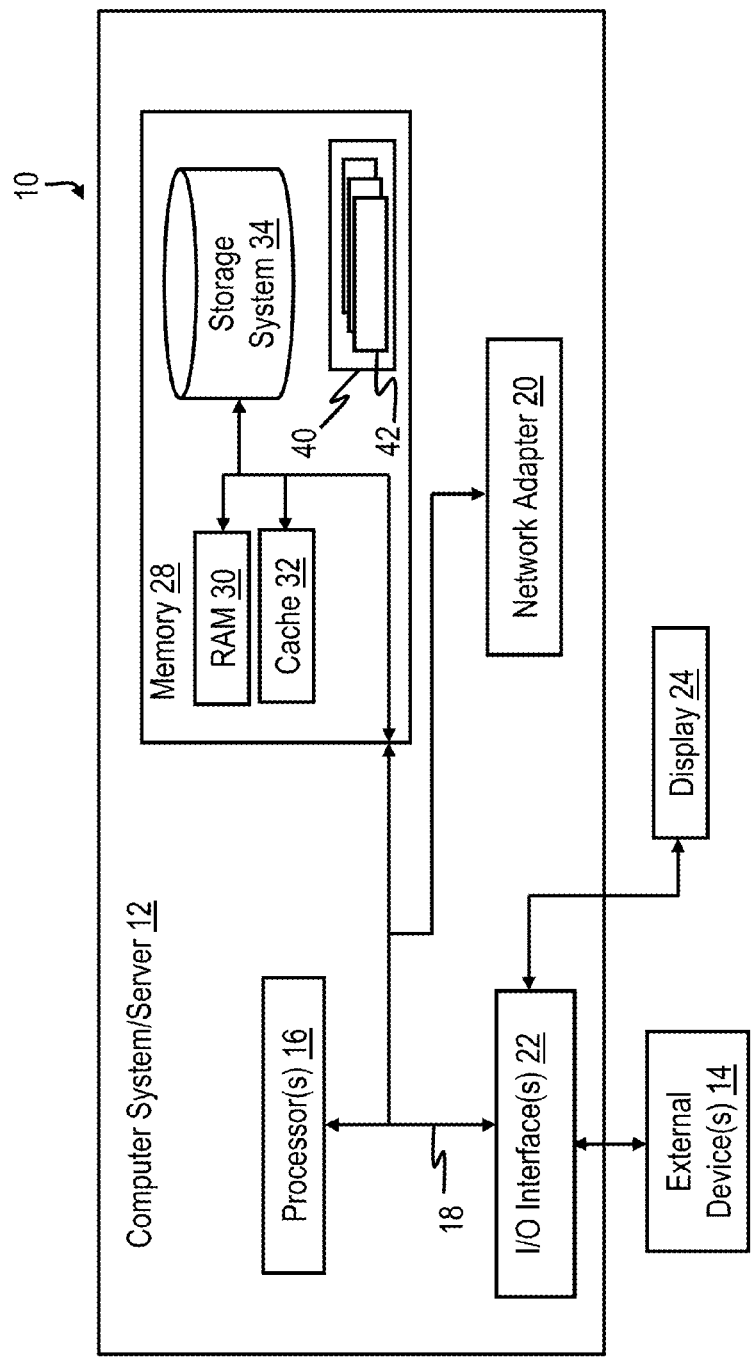
FIG. 1 depicts a relevant portion of an exemplary cloud computing node that is configured according to an embodiment of the present disclosure.

The illustrative embodiments provide a method, a data processing system, and a computer program product (embodied in a computer-readable storage medium) for implementing information services with tenant specific service level agreements in cloud computing environments.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

According to one aspect of the present disclosure, techniques are disclosed herein that increase software stack sharing capabilities by employing multi-tenant functions and service polymorphisms.

It should be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed, including client-server and peer-to-peer computing environments. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Cloud characteristics may include: on-demand self-service; broad network access; resource pooling; rapid elasticity; and measured service. Cloud service models may include: software as a service (SaaS); platform as a service (PaaS); and infrastructure as a service (IaaS). Cloud deployment models may include: private cloud; community cloud; public cloud; and hybrid cloud.

On-demand self-service means a cloud consumer can unilaterally provision computing capabilities, such as server time and network storage, as needed automatically without requiring human interaction with a service provider. Broad network access means capabilities are available over a network and accessed through standard mechanisms that promote use by heterogeneous thin or thick client platforms (e.g., mobile phones, laptops, and personal digital assistants (PDAs)). Resource pooling means computing resources of a provider are pooled to serve multiple consumers using a multi-tenant model, with different physical and virtual resources dynamically assigned and reassigned according to demand. In resource pooling there is a sense of location independence in that the consumer generally has no control or knowledge over the exact location of the provided resources but may be able to specify location at a higher level of abstraction (e.g., country, state, or datacenter).

Rapid elasticity means capabilities can be rapidly and elastically provisioned, in some cases automatically, to quickly scale-out and be rapidly released to quickly scale-in. To the consumer, the capabilities available for provisioning often appear to be unlimited and can be purchased in any quantity at any time. Measured service means cloud systems automatically control and optimize resource use by leveraging a metering capability at some level of abstraction that is appropriate to the type of service (e.g., storage, processing, bandwidth, and active user accounts). Resource usage can be monitored, controlled, and reported providing transparency for both the provider and consumer of the utilized service.

In an SaaS model the capability provided to the consumer is to use applications of a provider that are running on a cloud infrastructure. The applications are accessible from various client devices through a thin client interface such as a web browser (e.g., web-based e-mail). In the SaaS model, the consumer does not manage or control the underlying cloud infrastructure (including networks, servers, operating systems, storage, or even individual application capabilities), with the possible exception of limited user-specific application configuration settings.

In a PaaS model a cloud consumer can deploy consumer-created or acquired applications (created using programming languages and tools supported by the provider) onto the cloud infrastructure. In the PaaS model, the consumer does not manage or control the underlying cloud infrastructure (including networks, servers, operating systems, or storage), but has control over deployed applications and possibly application hosting environment configurations.

In an IaaS service model a cloud consumer can provision processing, storage, networks, and other fundamental computing resources where the consumer is able to deploy and run arbitrary software (which can include operating systems and applications). In the IaaS model, the consumer does not manage or control the underlying cloud infrastructure but has control over operating systems, storage, deployed applications, and possibly limited control of select networking components (e.g., host firewalls).

In a private cloud deployment model the cloud infrastructure is operated solely for an organization. The cloud infrastructure may be managed by the organization or a third party and may exist on-premises or off-premises. In a community cloud deployment model the cloud infrastructure is shared by several organizations and supports a specific community that has shared concerns (e.g., mission, security requirements, policy, and compliance considerations). The cloud infrastructure may be managed by the organizations or a third party and may exist on-premises or off-premises. In a public cloud deployment model the cloud infrastructure is made available to the general public or a large industry group and is owned by an organization selling cloud services.

In a hybrid cloud deployment model the cloud infrastructure is a composition of two or more clouds (private, community, or public) that remain unique entities but are bound together by standardized or proprietary technology that enables data and application portability (e.g., cloud bursting for load-balancing between clouds). In general, a cloud computing environment is service oriented with a focus on statelessness, low coupling, modularity, and semantic interoperability. At the heart of cloud computing is an infrastructure that includes a network of interconnected nodes.

With reference to FIG. 1, a schematic of an exemplary cloud computing node 10 is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth herein. Cloud computing node 10 includes a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 (in cloud computing node 10) is illustrated in the form of a general-purpose computing device. The components of computer system/server 12 may include, but are not limited to, one or more processors or processing units (including one or more processor cores) 16, a system memory 28, and a bus 18 that couples various system components (including system memory 28) to processors 16. Bus 18 represents one or more of any of several types of bus structures, including a memory bus or memory controller bus, a peripheral bus, an accelerated graphics port, and a processor or local bus using any of a variety of bus architectures. By way of example, and not limitation, such architectures include the industry standard architecture (ISA) bus, the micro channel architecture (MCA) bus, the enhanced ISA (EISA) bus, the video electronics standards association (VESA) local bus, and the peripheral components interconnect (PCI) bus.

Computer system/server 12 typically includes a variety of computer system readable media. Such media may be any available media that is accessible by computer system/server 12, and includes both volatile and non-volatile media, removable and non-removable media. System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, nonvolatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces.

As will be further depicted and described herein, memory 28 may include at least one program product having a set (e.g., at least one) of program modules that are configured to carry out the functions of various disclosed embodiments. Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, redundant array of inexpensive disk (RAID) systems, tape drives, and data archival storage systems, etc.

Figure 2:
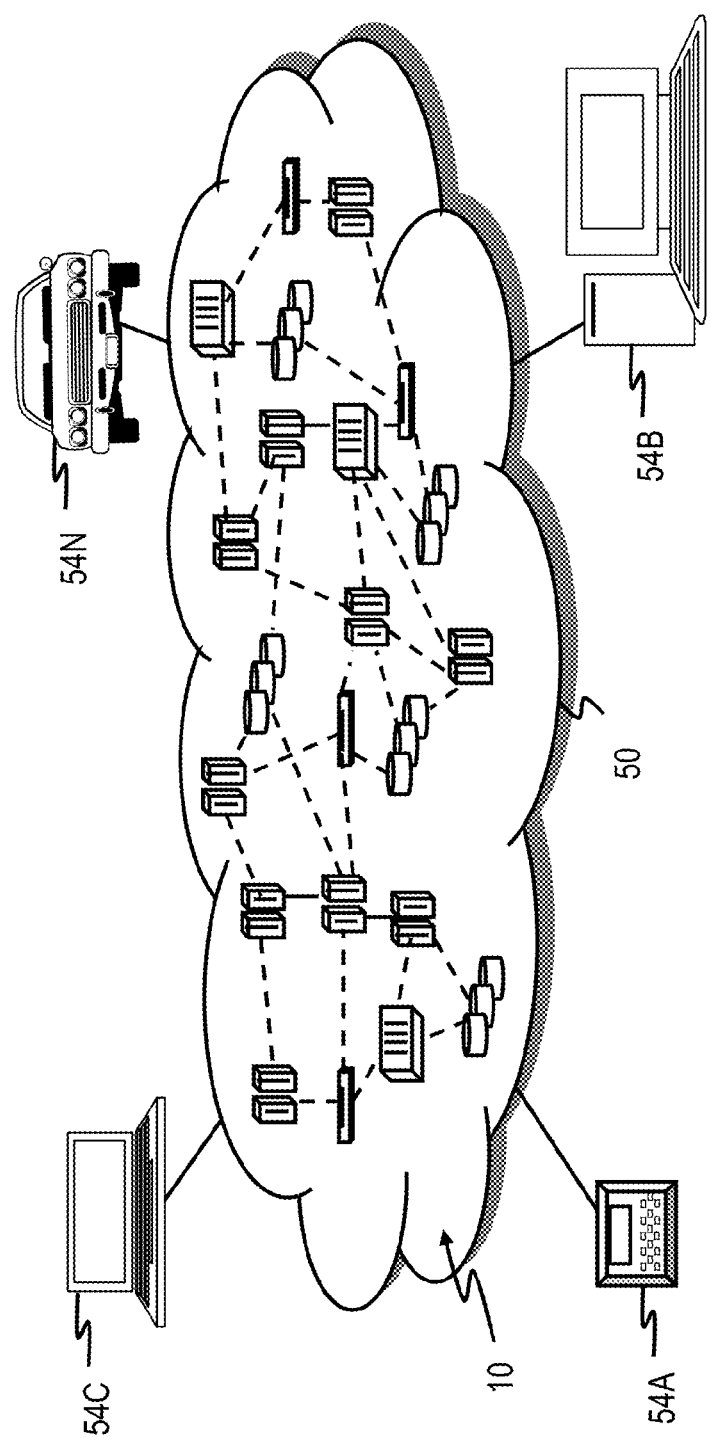
FIG. 2 depicts a relevant portion of an exemplary cloud computing environment that is configured according to an embodiment of the present disclosure.

With reference to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N, may communicate. Nodes 10 may communicate with one another and may be grouped (not shown) physically or virtually, in one or more networks, such as private, community, public, or hybrid clouds as described herein, or a combination thereof. In this manner, cloud computing environment 50 can offer infrastructure, platforms and/or software as services for which a cloud consumer does not need to maintain resources on a local computing device. It should be understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
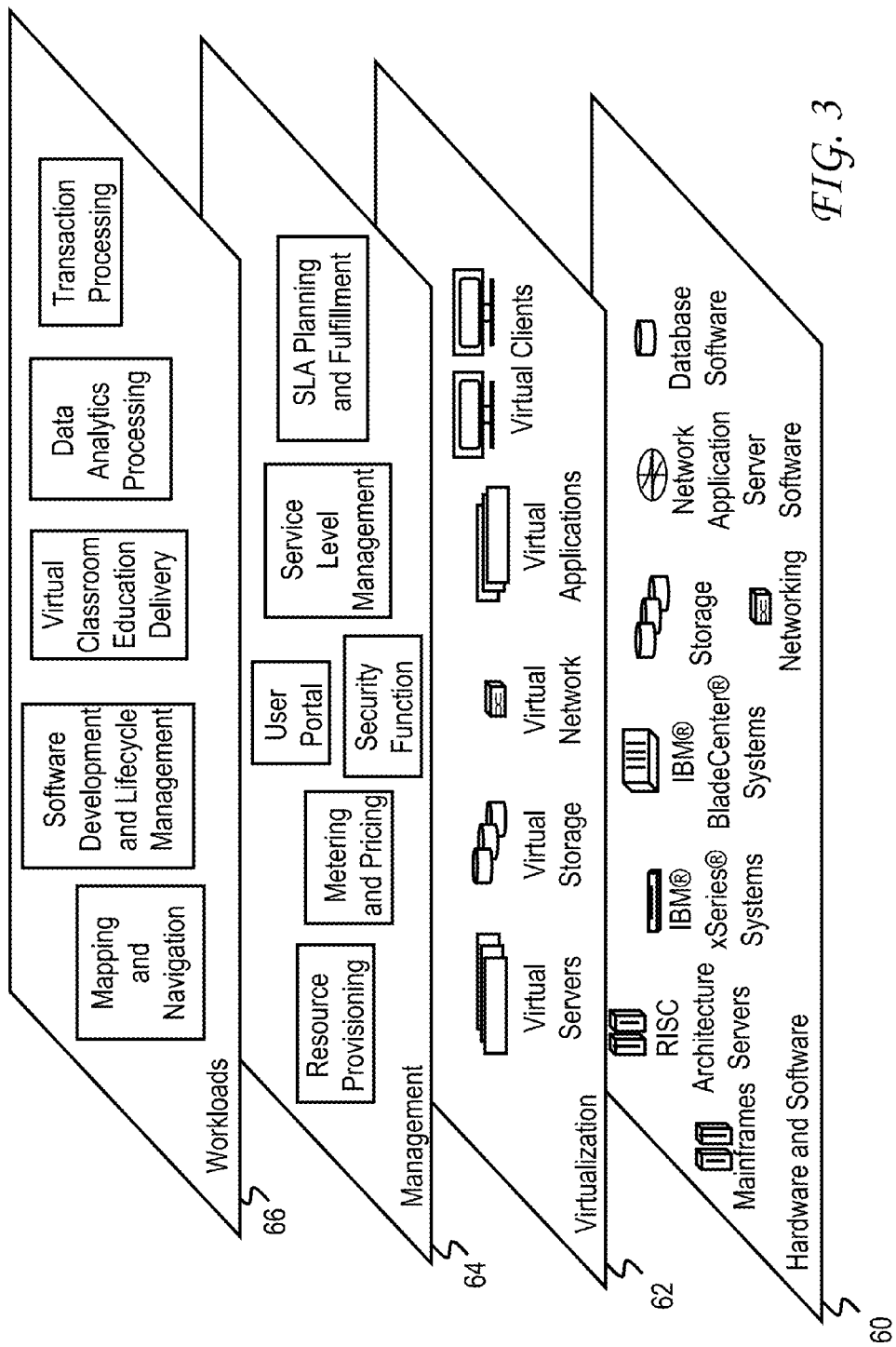
FIG. 3 depicts exemplary abstraction model layers of a cloud computing environment configured according to an embodiment of the present disclosure.

With reference to FIG. 3, a set of functional abstraction layers provided by cloud computing environment 50 (FIG. 2) is shown. It should be understood that the components, layers, and functions shown in FIG. 3 are intended to be illustrative only and embodiments of the invention are not limited thereto. As depicted in FIG. 3, cloud computing environment 50 includes a hardware and software layer 60, a virtualization layer 62, a management layer 64, and a workloads layer 66.

Hardware and software layer 60 includes various hardware and software components. As one example, the hardware components may include mainframes (e.g., IBM® zSeries® systems), reduced instruction set computer (RISC) architecture based servers (e.g., IBM pSeries® systems), IBM xSeries® systems, IBM BladeCenter® systems, storage devices, networks and networking components. As another example, the software components may include network application server software (e.g., IBM WebSphere® application server software) and database software (e.g., IBM DB2® database software). IBM, zSeries, pSeries, xSeries, BladeCenter, WebSphere, and DB2 are trademarks of International Business Machines Corporation registered in many jurisdictions worldwide.

Virtualization layer 62 provides an abstraction layer in which virtual entities (e.g., virtual servers, virtual storage, virtual networks (including virtual private networks), virtual applications and operating systems, and virtual clients are included. As previously discussed, these virtual entities may be accessed by clients of cloud computing environment 50 on-demand. The virtual entities are controlled by one or more virtual machine monitors (VMMs) that may, for example, be implemented in hardware and software layer 60, virtualization layer 62, or management layer 64.

Management layer 64 provides various functions (e.g., resource provisioning, metering and pricing, security, user portal, service level management, and SLA planning and fulfillment). The resource provisioning function provides dynamic procurement of computing resources and other resources that are utilized to perform tasks within the cloud computing environment. The metering and pricing function provides cost tracking (as resources are utilized within the cloud computing environment) and billing or invoicing for consumption of the utilized resources. As one example, the utilized resources may include application software licenses.

The security function provides identity verification for cloud consumers and tasks, as well as protection for data and other resources. The user portal function provides access to the cloud computing environment for consumers and system administrators. The service level management function provides cloud computing resource allocation and management such that required service levels are met. For example, the security function or service level management function may be configured to limit deployment/migration of a virtual machine (VM) image to geographical location indicated to be acceptable to a cloud consumer. The service level agreement (SLA) planning and fulfillment function provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Information services are one of the cornerstones of information technology (IT) infrastructures. In general, information services may be defined as the layer of a service oriented architecture (SOA) that provides an application access to information, while hiding the details of the underlying data store (so the data store can evolve and change without requiring the application to change and the application can provide the services, as needed), and allows a service provider to enforce policies (e.g., business integrity policies and security policies) at a layer that is consistent with the business view of the data. The demand for processing larger data volumes within smaller processing windows increases the operational cost of information services. To address the increasing operational cost of information services, cloud computing has been devised to offer the ability to share infrastructure cost among multiple consumers or tenants. According to one aspect of the present disclosure, a server is configured to check tenant identifiers (IDs) when requests for information services are received and route the tenant requests to an agent based on the tenant IDs. In various embodiments, the agent is configured to implement tenant specific service level agreements (SLAs) in selecting transformation logic and data sources/targets to be utilized in servicing the tenant requests.

Information services sharing in multi-tenant cloud environments has usually been limited to the sharing of hardware, as a software stack usually tends to be specific to each tenant since data and data transformation are usually tenant specific. Multi-tenant cloud environments usually employ unique information service endpoints and may implement interfaces that are specific for each tenant. Conventional multi-tenant cloud environments have generally lacked the flexibility to create higher level composed services (through, for example, an enterprise service bus (ESB)) that might also need to be multi-tenant.

According to one or more embodiments, techniques are disclosed that increase software stack sharing capabilities by employing multi-tenant functions and service polymorphisms. As used herein, 'polymorphism' refers to the ability to define a common service interface, while allowing changes in the way an underlying service is routed, assigned resources, and implemented based on tenant specific considerations. In this manner, common implementations and resources may be utilized by multiple tenants, when appropriate, to facilitate cost savings via infrastructure sharing.

According to aspects of the present disclosure, common information service interfaces and endpoints are employed (to the extent permissible) in order to maximize the sharing of the underlying infrastructure. Employing service implementation polymorphism based on a calling tenant facilitates different behaviors that may be required for different tenants. In general, information services are often used as part of a higher level service composition, e.g., a more complex master data management service, an ESB service, or a composite service component architecture (SCA). Employing a common service interface and endpoint for underlying information services allows higher level composition components to be multi-tenant capable, while still maintaining a relatively simple composition. According to one or more aspects of the present disclosure, tenant specific polymorphic implementations are implemented with a common interface and endpoint.

Service tenant polymorphism can take various forms. For example, a completely different service implementation can be provided to different tenants or the same service implementation can be reused with different data sources/targets for different tenants. According to one or more embodiments, the selection of the service implementation is performed dynamically at runtime, based on the service caller (i.e., the tenant). In traditional object oriented polymorphism, the service implementation is determined at service instantiation, usually using a factory pattern. According to one or more aspects of the present disclosure, a dynamic service implementation selection mechanism (that is based on tenant identity) is employed at the time of service invocation.

In general, SLAs have traditionally been directed toward performance, availability, and scalability. According to the present disclosure, implementing information service tenant polymorphisms facilitates extending the semantics of SLAs to encompass more information oriented concepts, e.g., the quality or quantity of reference data or the algorithm or algorithms used for data processing, such as specific standardized or matching algorithms.

The disclosed techniques generally increase the ability to share an information services infrastructure. With a common service interface and endpoint, middleware that hosts service entry points can be completely shared by all tenants. In general, middleware is responsible for the initial decoding of a service request (e.g., decoding a simple object access protocol (SOAP) message) and the selection of the service implementation to use according to the calling tenant. Typically, the initial decoding of a service request and the selection of the service implementation are not the time-consuming part of an information service invocation and are not subject to many SLA constraints that are different between tenants, which facilitates further sharing of the services infrastructure. As such, information service providers can usually focus more on service business logic (i.e., information processing) and less on front-end hosting infrastructure.

It should be appreciated that service implementations can take various shapes and forms, including the off-loading of processing to a separate server or a dedicated data processing engine, which may be required for certain tenant SLA constraints, e.g., data isolation or processing power capabilities. The extension of traditional SLA semantics to more information service oriented concepts, e.g., data providers or data processing algorithms, facilitates added customer value by providing guarantees on the data processing mechanism. The extension of traditional SLA semantics to information service oriented concepts also usually provides more flexibility and options in the pricing definitions of an information as a service offering.

In general, information service polymorphism (i.e., how to provide various information service implementations for the same service interface and endpoint) may be applied to transformation logic and/or data sources/targets. As used herein, 'transformation logic' refers to the algorithm (or algorithms) used to transform data, 'data sources' refers to the locations of the data to be transformed, and 'data targets' refers to the locations where the transformed data is stored. In general, an infrastructure should be capable of configuring the transformation logic and/or the data sources/targets in a tenant specific manner in order to maximize sharing capabilities and to provide maximum flexibility in information service implementations.

Transformation logic polymorphism may be achieved by dissociating the way the information service is exposed to callers (tenants). In a typical implementation, the service interface and endpoint are the parts that are exposed to callers and that are shared by all tenants. The service interface and endpoint may be hosted in a shared infrastructure that is responsible for receiving service requests, performing the service format specific decoding (e.g., the decoding of a SOAP message), and selecting and sending the decoded request to the right service implementation according to the current tenant.

The service implementation (or service provider) provides the actual data processing and transformation logic and may take various shapes and/or forms. For example, the service implementation may vary between a relatively simple piece of Java code that runs directly within the shared infrastructure to something that is more complex but more flexible where data processing is off-loaded to a dedicated data processing engine. For a given information service, a service provider interface is defined to include a single process request operation, taking as input the service input arguments and returning the service output arguments in a service agnostic format (e.g., Java data objects (JDOs), or service data objects (SDOs)). Tenant specific implementations may be provided by adding an implementation of the service provider interface.

As one example, an InfoSphere® information services director (ISD) is a typical implementation of the more complex and flexible case. As is known, the InfoSphere® ISD is configured to facilitate publishing tasks as reusable services in an SOA. In one or more embodiments, the shared infrastructure is provided by an ISD server that may be hosted within, for example, a WebSphere® application server. In this embodiment, the ISD server provides the handling and decoding of an initial service request. The ISD server then dispatches the request to a specialized data processing and transformation engine, e.g., an InfoSphere® DataStage/QualityStage, or a DB2® (which is a relational model database server) federation. In a disclosed embodiment, dispatch is performed through dedicated ISD agents that are the gateways between the shared infrastructure and the data transformation engines.

Figure 4:
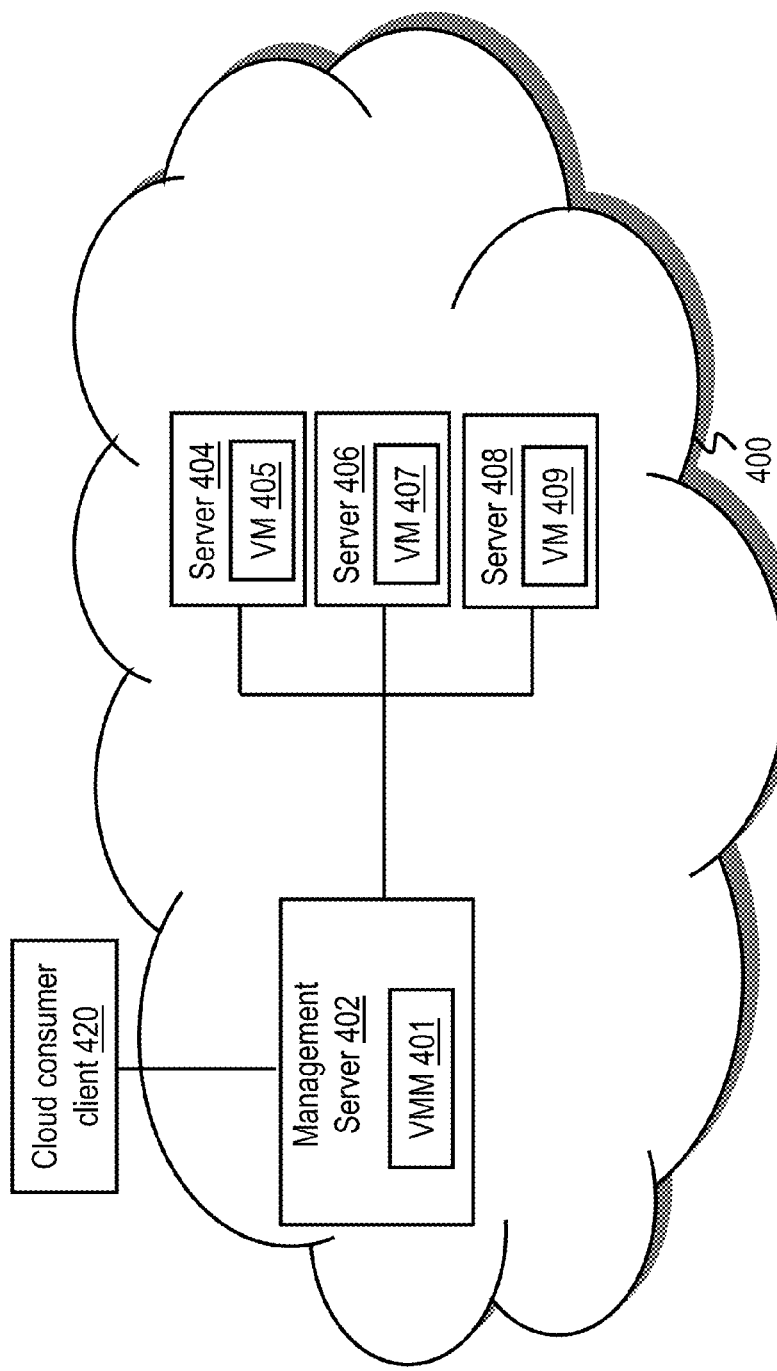
FIG. 4 is a diagram of a relevant portion of an exemplary cloud computing environment that includes a management server (data processing system) configured in accordance with various embodiments of the present disclosure to implement information services with tenant specific service level agreements.

With reference to FIG. 4, a cloud computing environment 400 is illustrated that is configured to process an information service request with tenant specific routing capabilities, according to an aspect of the present disclosure. Cloud computing environment 400 includes a management server (data processing system) 402 that implements a virtual machine monitor (VMM) 401 and is in communication with a cloud consumer client (tenant) 420 and exemplary servers 404, 406, and 408. Management server 402, which handles and decodes service requests may be, for example, an ISD server that functions as a shared interface for multiple tenants. Server 404 executes a virtual machine (VM) 405, server 406 executes a VM 407, and server 408 executes a VM 409. While only three servers 404, 406, and 408 are illustrated in cloud computing environment 400, it should be appreciated that more or less than three servers may be implemented within a cloud computing environment configured according to the present disclosure. Moreover, while servers 404, 406, and 408 are only illustrated as executing a single VM, it should be appreciated that servers 404, 406, and 408 may each execute one or more VMs and may each execute one or more VMMs, which may be implemented, for example, in hardware and software layer 60, virtualization layer 62, or as a resource provisioning function in management layer 64 of computing environment 50.

Management server 402, as well as servers 404, 406, and 408, may be configured in a similar manner as computer system/server 12 of FIG. 1. Management server 402 may, for example, be implemented within hardware and software layer 60 of computing environment 50. In this example, servers 404, 406, and 408 may be in the same or different geographical locations within the United States or other countries.

VMs 405, 407, and 409 may each be configured to support multiple tenants based on tenants assigned to the VMs 405, 407, and 409 by one or more agents (which may be included within VMM 401). In determining which tenants to assign to which VMs 405, 407, and 409, VMM 401 may consider whether a current workload of VMs 405, 407, and 409 allows for an additional tenant workload while still meeting tenant specific SLAs. VMM 401 may, for example, deploy/migrate workload dynamically to one or more other servers within cloud computing environment 400 to meet tenant specific SLAs. Management server 402 is configured to receive service requests from tenant 420 and route the service requests to an agent (e.g., based on a tenant ID) that selects transformation logic and data sources/targets to service the request (e.g., by routing service requests to one of VMs 405, 407, and 409 for service) based on the tenant ID.

Figure 5:
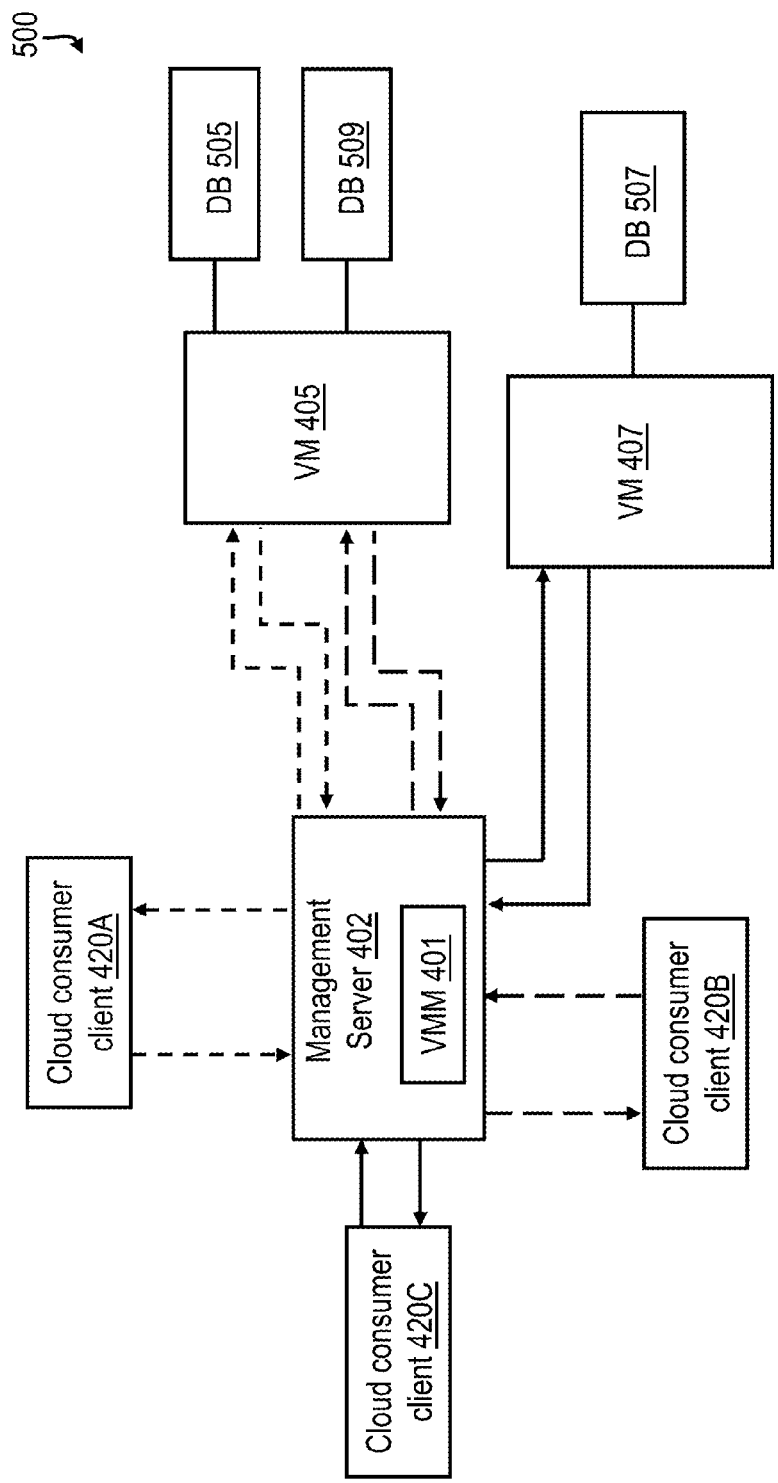
FIG. 5 is a diagram of a relevant portion of an exemplary cloud computing environment that includes a management server (data processing system) configured in accordance with various embodiments of the present disclosure to implement information services with tenant specific service level agreements.

With reference to FIG. 5, a cloud computing environment 500 is illustrated that is configured to process information service requests with tenant specific routing capabilities, according to an aspect of the present disclosure. Cloud computing environment 500 includes management server 402 that implements VMM 401 and is in communication with tenants 420A, 420B, and 420C. As is illustrated, management server 402 is also in communication with VMs 405 and 407. VM 405 is communication with database (DB) 505 and DB 509 and VM 407 is in communication with DB 507. As is shown in FIG. 5, management server 402 provides an interface to receive service requests from tenants 420A, 420B, and 420C and to provide responses to tenants 420A, 420B, and 420C. An agent, e.g., implemented within VMM 401 or elsewhere within management server 402, is configured to dynamically route tenant requests based on tenant specific SLAs, which are indicated by tenant IDs. As is shown in FIG. 5, services requests for tenants 420A and 420B are dynamically routed to VM 405 (based on tenant IDs for tenants 420A and 420B) and service requests for tenant 420C are dynamically routed to VM 407 (based on a tenant ID for tenant 420C). In this example, VM 405 implements the same transformation logic for tenants 420A and 420B and VM 407 implements different transformation logic for tenants 420C. It should be appreciated that data sources/targets for tenants 420A and 420B may be provided by DB 505 and/or DB 509 and data sources/targets for tenant 420C are provided by DB 507. Tenants 420A and 420B may, for example, share a same database (e.g., DB 505) or databases (e.g., DB 505 and DB 509). Tenants 420A and 420B may employ a same schema or a different schema for DBs 505, 507, and 509.

In one or more embodiments, transformation logic polymorphism can be viewed as a superset of the data sources/targets case. For example, implementing tenant specific transformation logic may fix the data sources/targets that the transformation logic uses. In general, tenant specific data sources/targets are valuable when transformation logic can be shared by multiple tenants and only the data acted upon by the transformation logic is tenant specific.

In most cases, access interfaces for data sources/targets are standardized. For example, an access interface may take the form of: flat files (e.g., file access application programming interfaces (APIs)); relational database management systems (RDBMSs) (e.g., structure query language (SQL), Java database connectivity (JDBC), and open database connectivity (ODBC) interfaces); queues/topics (e.g., a Java message service (JMS) interface); and traditional data process engines (e.g., InfoSphere® DataStage/QualityStage), which already separate the physical connection information (e.g., file path, JDBC/ODBC connection, uniform resource locators (URLs)) from the transformation logic. According to one or more aspects of the present disclosure, dynamic selection of the physical connection information based on the current tenant is implemented.

In general, selection of the information service implementation includes identification of the current tenant, selection of the corresponding tenant transformation logic (if any), and selection of the tenant specific data sources and targets (if any). The identification of the tenant may be provided by the entry-point infrastructure (e.g., implemented by management server 402) that receives the information service request. The identity of the service caller (tenant) may be established through any appropriate authentication mechanisms. For example, a user identifier (ID), a user password, web services security (WSS) tokens, or certificates can be used as a tenant ID or utilized to identify a tenant through a group or role memberships. Employing a user ID may be the simplest mechanism for identifying a tenant, as the approach may leverage identity access and management capabilities of an existing infrastructure, since the user ID is usually the only identity related information that is flowing through infrastructure containers, as it is needed for authorization decisions.

Tenant identification may also be completely dissociated from a calling tenant ID. For example, a specific tenant 'key' may be provided as part of an information service call, or the origin of a calling tenant (e.g., host name, or Internet protocol (IP) address of the caller) can be used to determine an appropriate tenant ID. In general, a tenant ID may be derived from the service request payload or from the service request context (e.g., a hypertext transfer protocol (HTTP) header of an HTTP based service request) or from a mapping of a user to a tenant. In a typical implementation, the infrastructure is flexible in the selection of where the tenant ID is derived (e.g., caller identity, service request payload, or service request context) and is able to propagate the information to the information service provider. For example, the infrastructure may propagate context information through service implementations, explicit API input arguments, thread local variables, or custom security attributes. For a Java based environment, tenant specific context and associated custom attributes may be standardized.

Once the tenant has been properly identified by the infrastructure, the appropriate transformation logic is dynamically selected at runtime (i.e., at the time the information service request is received). For example, with reference to FIG. 4 an appropriate one of VMs 405, 407, and 409, may be selected by an agent (not separately shown) of VMM 401 to service a received service request based on a tenant ID associated with the received service request. In various embodiments, the infrastructure is configured to provide a flexible and dynamic mapping mechanism between tenant IDs and information service implementations. In at least one embodiment, an administrator can change the mapping through a comprehensive user interface and any changes may then be taken into account at runtime. For example, the actual transformation logic selection process can use a simple factory based mechanism to a more complex pooling mechanism. In general, pooling mechanisms can also be used to configure and handle traditional availability and scalability SLA constraints.

Tenant specific routing may encompass the selection of a specific agent (e.g., an ISD agent) to process the request. The selection of the specific agent can be, for example, driven by performance and scalability tenant specific SLAs. Tenant specific routing may encompass the selection of a specific DataStage or QualityStage job at the agent level. For example, tenant specific routing may be driven by the data oriented tenant SLAs (i.e., which transformation logic to use). Typically, data sources/targets selection is technically harder to achieve. However, there are many ways that data sources/targets can deal with multi-tenant data (e.g., separate databases, a same database with separate schemas, or a same database with a same schema). In general, the selection process may occurs relatively deep within the information service implementation (i.e., within the transformation logic).

Tenant identification can mean different things for different data sources and targets. Tenant identification may identify: a specific database or schema; the value of a specific column in a table; or a user ID may be used to authenticate a user with a data source/target. In one or more embodiments, an infrastructure provides maximum flexibility in the data sources and data targets selection by: properly propagating a tenant ID through the various information service layers; and correctly mapping the tenant ID in a data source/target specific fashion. For example, an RDBMS source might require an extra WHERE clause in a structured query language (SQL) statement in order to select tenant specific data. As another example, a different data source may require access to a completely separate database and database server (for full tenant data isolation).

The dynamic capabilities required to properly address tenant identification mapping to data sources/targets is usually a weak point in existing infrastructures. In the typical case of an RDBMS data source/target, various different levels of the RDBMS access should ideally be fully dynamic. However, using conventional approaches, only SQL parameters are dynamic. According to one or more aspects of the present disclosure, SQL parameters, SQL queries, schema, table space, database selection, and database server selection are all fully dynamic in order to correctly map tenant IDs to appropriate data sources/targets. As one example, dynamic SQL queries facilitate different queries (at least different WHERE clauses) for different tenants.

SLAs are the typical way in which a contract for a service subscription is specified. Conventionally, SLAs have usually covered aspects like security, performance, scalability, and functional aspects. While these aspects are applicable to information services (e.g., deciding on which computer node of a data stage (DS) parallel engine might provide the best performance) there are information-centric and data-centric characteristics for SLAs that are specific to information services. From an implementation perspective, the information specific SLA characteristics can either be implemented as an extension to the overall service SLA or as a separate SLA attached to the outmost service in case of a service composite and appropriately passed to nested services, as needed. An SLA can also be provided with many different technologies (e.g., extensible markup language (XML) and property files including key/value pairs).

An SLA may offer a tenant a number of different information-centric characteristics for selection. For example, data isolation may require a separate database, a same database with separate schema, or a same database with a same schema. Based on the data isolation selection, persistency access and an SQL query may need to be dynamically adjusted. As another example, data encryption may specify security for data in motion, security for data in a production database, and security for data at rest. Data in motion may require that a secure communication channel (e.g., a secure socket layer (SSL)) and a message encryption be separately selectable. Data in a production database may employ database encryption features either for all records/fields or only on sensitive fields (e.g., a social security number (SSN) field). Data at rest may require backup and protection by encryption.

Compliance with specific privacy/data protection regulations may vary by country. For example, customer information according to Swiss law has to physically reside within Switzerland. As another example, German citizen employee information cannot be processed by IT systems outside Germany, without written approval from the employee. If legal compliance is required, an operational model of the service should support legal compliance with an appropriate federated architecture (e.g., an architecture than includes a mobile device management (MDM) server). An SLA may also offer a tenant choices on standardized services, such as address validation, data enrichment, matching, and survivorship. If data enrichment is selected, a third party provider for which a tenant has a valid license key (e.g., Dun and Bradstreet, Verispan, Facebook, and LinkedIn) may be chosen. Matching may utilize, for example, deterministic matching or probabilistic matching. Automatic survivorship may be applied with a default rule-set or a tenant specific rule-set. A common service to create an address may, for example, offer data isolation, standardization, address validation, and/or mapping. For example, data isolation may include: a separate database, a same database with separate schema, or a same database with the same schema. In any case, based on the data isolation selection the persistency access (including the SQL query) may be dynamically adjusted. Assuming mapping is selected, a subscribing tenant may provide a license key (or the service provider may have an appropriate subscription and charges the subscribing tenant for the feature).

It should be appreciated that, depending on the selections made by a tenant, the same service interface with the same data model may provide different capabilities based on the SLA, thus enabling polymorphic behavior of the information services. Data operated on by transformation logic may take various forms. For example, data may include business metadata, technical metadata, operational metadata, reference data (e.g., look-up tables and hierarchical reference data), master data (e.g., customer data, product data, supplier data, account data, and network asset data), operational data (e.g., customer relationship management (CRM) data, enterprise resource planning (ERP) data, source control management (SCM) data, and human resource (HR) data), unstructured data (contracts, movies, and joint photographic experts group (JPEG) images), and analytical data (e.g., data warehouse (DW) data, big data, entity analytics, predictive analytics, and data mining).

Figure 6:
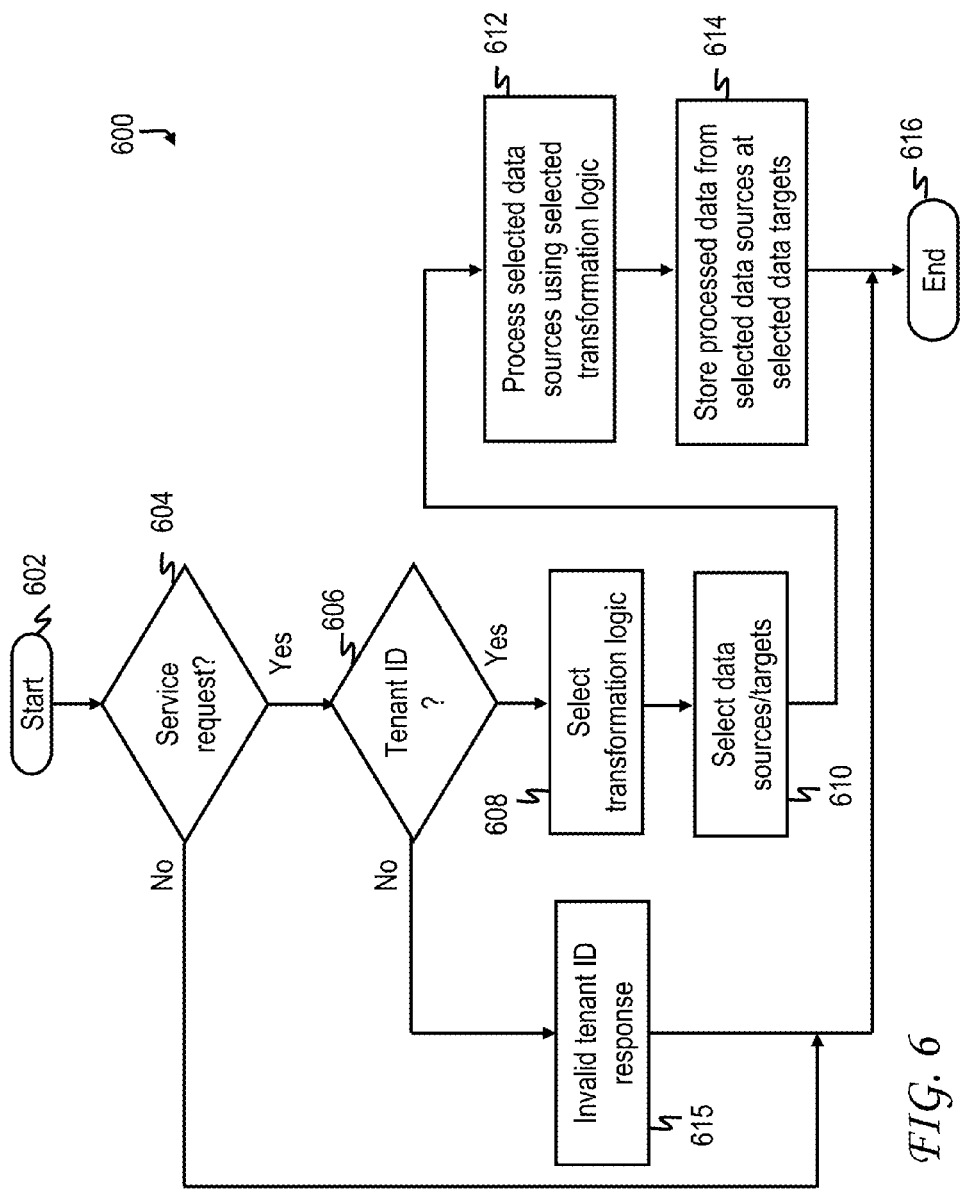
FIG. 6 is a flow chart for an exemplary process that implements information services with tenant specific service level agreements according to various embodiments of the present disclosure.

With reference to FIG. 6, a flow chart for an exemplary process 600 that implements information services with tenant specific SLAs, according to various embodiments of the present disclosure, is illustrated. For ease of understanding, process 600 is discussed in conjunction with cloud computing environment 500 of FIG. 5. Process 600 may, for example, be performed (at least in part) by an agent of management server 402. Process 600 begins (e.g., in response to receipt (by management server 402) of a communication by a cloud consumer) at block 602, at which point control transfers to decision block 604. In block 604, management server 402 determines whether the communication is a service request from a subscribing tenant (e.g., one of tenants 420A, 420B, and 420C). If the communication is not a service request, control transfers from block 604 to block 616, where process 600 terminates.

Next, in decision block 606, management server 402 determines whether a valid tenant ID is associated with the service request. For example, management server 402 may access a database to determine whether a valid tenant ID was received with the service request. In the event a valid tenant ID was not received in block 606, control transfers to block 615 where management server 402 provides a response that indicates that the tenant ID is invalid. Following block 615 control transfers to block 616. In the event that the tenant ID is valid in block 606 control transfers to block 608.

In block 608, an agent of management server 402 selects transformation logic for processing the service request based on the tenant ID. For example, the agent of management server 402 may select transformation logic by selecting a particular VM to process the service request. Next, in block 610, the agent of management server 402 selects data sources/targets for the service request based on the tenant ID. For example, the agent of management server 402 may select data sources/targets by selecting a particular database that may be accessed by the particular VM. Alternatively, by selecting a particular VM, the agent of management server 402 may also select a particular database as the data source and the data target. Next, in block 612, the selected VM processes data from the selected data sources using the selected transformation logic. Then, in block 614, the selected VM stores the processed data from the selected data sources at selected data targets. According to one or more embodiments of the present disclosure, data source/target queries/requests are based on a tenant ID. In this manner the selected transformation logic becomes tenant specific logic. Following block 614, control transfers to block 616 where process 600 terminates.

In the flow chart above, the method depicted in FIG. 6 may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for selecting an information service implementation, comprising:
    receiving, at a data processing system that functions as a shared interface for multiple tenants, a service request that includes a tenant identifier that uniquely identifies a calling tenant;
    selecting, by the data processing system, transformation logic provided by a specific virtual machine to service the service request based on the received tenant identifier to implement a tenant specific service level agreement for the calling tenant;
    selecting, by the data processing system, one or more data sources and one or more data targets for the service request based on the received tenant identifier to implement the tenant specific service level agreement for the calling tenant;
    processing, by the data processing system, data from the selected data sources using the selected transformation logic, wherein the selected transformation logic implements one or more algorithms that are used to transform the data; and
    storing, by the data processing system, the processed data at the selected data targets.

2. The method of claim 1, wherein the tenant identifier corresponds to a user identifier, a user password, a security token, or a certificate.

3. The method of claim 1, wherein the tenant identifier is derived from a payload or context of the service request or a mapping of a user to the calling tenant.

4. The method of claim 1, wherein the transformation logic to service the service request is selected at runtime.

5. The method of claim 1, wherein the selecting, by the data processing system, transformation logic to service the service request based on the received tenant identifier further comprises:
    selecting, by the data processing system, a specific agent to process the service request based on the received tenant identifier.

6. The method of claim 1, wherein the selecting, by the data processing system, one or more data sources and one or more data targets for the service request based on the received tenant identifier further comprises:
    selecting, by the data processing system, one of a shared database for multiple tenants, a shared database with separate schemas for different tenants, or a shared database with shared schema for multiple tenants for the service request based on the received tenant identifier.

7. The method of claim 1, wherein the selecting, by the data processing system, one or more data sources and one or more data targets for the service request based on the received tenant identifier further comprises:
    selecting, by the data processing system, one of a shared database for multiple tenants, a shared database with separate schemas for different tenants, or a shared database with shared schema for multiple tenants for the service request based on the received tenant identifier and a service level agreement for the calling tenant.

8. A computer program product for selecting an information service implementation, the computer program product comprising:
    a computer-readable storage device having computer-readable program code embodied thereon, wherein the computer-readable program code, when executed by a data processing system that functions as a shared interface for multiple tenants, causes the data processing system to:
    receive a service request that includes a tenant identifier that uniquely identifies a calling tenant;
    select transformation logic provided by a specific virtual machine to service the service request based on the received tenant identifier to implement a tenant specific service level agreement for the calling tenant;
    select one or more data sources and one or more data targets for the service request based on the received tenant identifier to implement the tenant specific service level agreement for the calling tenant;
    process data from the selected data sources using the selected transformation logic, wherein the selected transformation logic implements one or more algorithms that are used to transform the data; and
    store the processed data at the selected data targets.

9. The computer program product of claim 8, wherein the tenant identifier corresponds to a user identifier, a user password, a web services security (WSS) token, or a certificate.

10. The computer program product of claim 8, wherein the tenant identifier is derived from a payload or context of the service request or a mapping of a user to the calling tenant.

11. The computer program product of claim 8, wherein the transformation logic to service the service request is selected at runtime.

12. The computer program product of claim 8, wherein the computer-readable program code, when executed by a data processing system, further causes the data processing system to:
   select a specific agent to process the service request based on the received tenant identifier.

13. The computer program product of claim 8, wherein the computer-readable program code, when executed by a data processing system, further causes the data processing system to:
   select one of a shared database for multiple tenants, a shared database with separate schemas for different tenants, or a shared database with shared schema for multiple tenants for the service request based on the received tenant identifier.

14. The computer program product of claim 8, wherein the computer-readable program code, when executed by a data processing system, further causes the data processing system to:
   select one of a shared database for multiple tenants, a shared database with separate schemas for different tenants, or a shared database with shared schema for multiple tenants for the service request based on the received tenant identifier and a service level agreement for the calling tenant.

15. A data processing system that functions as a shared interface for multiple tenants, comprising:
   a memory; and
   a processor core coupled to the memory, wherein the processor core is configured to:
      receive a service request that includes a tenant identifier that uniquely identifies a calling tenant;
      select transformation logic provided by a specific virtual machine to service the service request based on the received tenant identifier to implement a tenant specific service level agreement for the calling tenant;
      select one or more data sources and one or more data targets for the service request based on the received tenant identifier to implement the tenant specific service level agreement for the calling tenant;
      process data from the selected data sources using the selected transformation logic, wherein the selected transformation logic implements one or more algorithms that are used to transform the data; and
      store the processed data at the selected data targets.

16. The data processing system of claim 15, wherein the tenant identifier corresponds to a user identifier, a user password, a web services security (WSS) token, or a certificate.

17. The data processing system of claim 15, wherein the tenant identifier is derived from a payload or context of the service request or a mapping of a user to the calling tenant.

18. The data processing system of claim 15, wherein the transformation logic to service the service request is selected at runtime.

19. The data processing system of claim 15, wherein the processor core is further configured to:
   select a specific agent to process the service request based on the received tenant identifier.

20. The data processing system of claim 15, wherein the processor core is further configured to:
   select one of a shared database for multiple tenants, a shared database with separate schemas for different tenants, or a shared database with shared schema for multiple tenants for the service request based on the received tenant identifier and a service level agreement for the calling tenant.

* * * * *